(12) United States Patent
Heuver

(10) Patent No.: US 8,128,529 B2
(45) Date of Patent: Mar. 6, 2012

(54) STABILIZING A PLANETARY PINION CARRIER OF AN AUTOMATIC TRANSMISSION

(75) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 12/499,873

(22) Filed: Jul. 9, 2009

(65) Prior Publication Data
US 2011/0009234 A1    Jan. 13, 2011

(51) Int. Cl.
*F16H 57/08* (2006.01)
(52) U.S. Cl. ........................................................ 475/331
(58) Field of Classification Search .................. 475/331, 475/346
See application file for complete search history.

(56) References Cited

U.S. PATENT DOCUMENTS

| | | | | |
|---|---|---|---|---|
| 3,770,075 A * | 11/1973 | Vegners | ........................ | 180/308 |
| 4,994,007 A * | 2/1991 | Miura et al. | .................. | 475/346 |
| 5,269,733 A * | 12/1993 | Anthony, III | ................. | 475/331 |
| 5,715,918 A | 2/1998 | Everett et al. | | |
| 2001/0017149 A1* | 8/2001 | Massaro | ........................ | 134/112 |
| 2003/0089569 A1 | 5/2003 | Antonov et al. | | |
| 2007/0066440 A1* | 3/2007 | Kitahara et al. | ............. | 475/331 |
| 2008/0116431 A1* | 5/2008 | Elliott et al. | .................. | 254/355 |
| 2011/0092333 A1* | 4/2011 | Murata et al. | ................. | 475/331 |

* cited by examiner

*Primary Examiner* — Roger Pang
(74) *Attorney, Agent, or Firm* — David B. Kelley, Esq.; MacMillan, Sobanski & Todd, LLC

(57) ABSTRACT

An assembly for stabilizing a gear unit of a transmission for an automotive vehicle includes a first component fixed against displacement along an axis, a carrier facing the first component, supported for rotation about the axis, and supporting planet pinion thereon, and springs located between the first component and the carrier, producing axial forces distributed angularly around the axis and applied to the carrier.

19 Claims, 3 Drawing Sheets

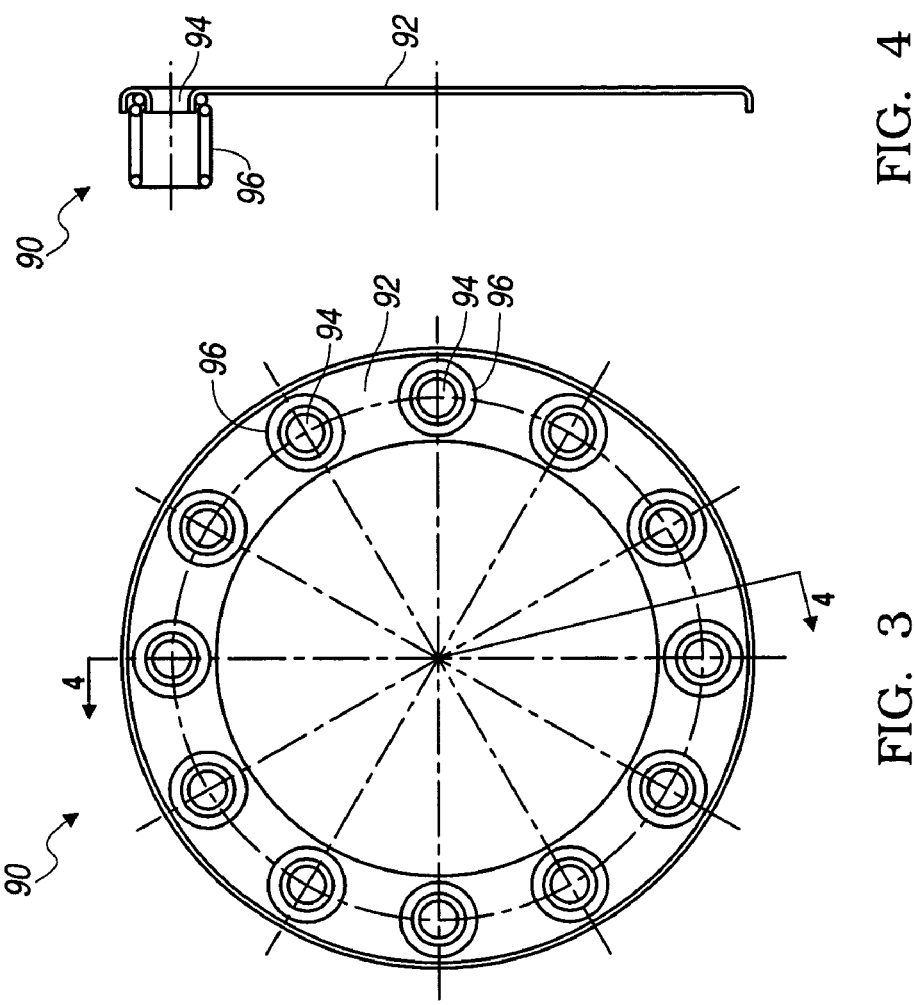
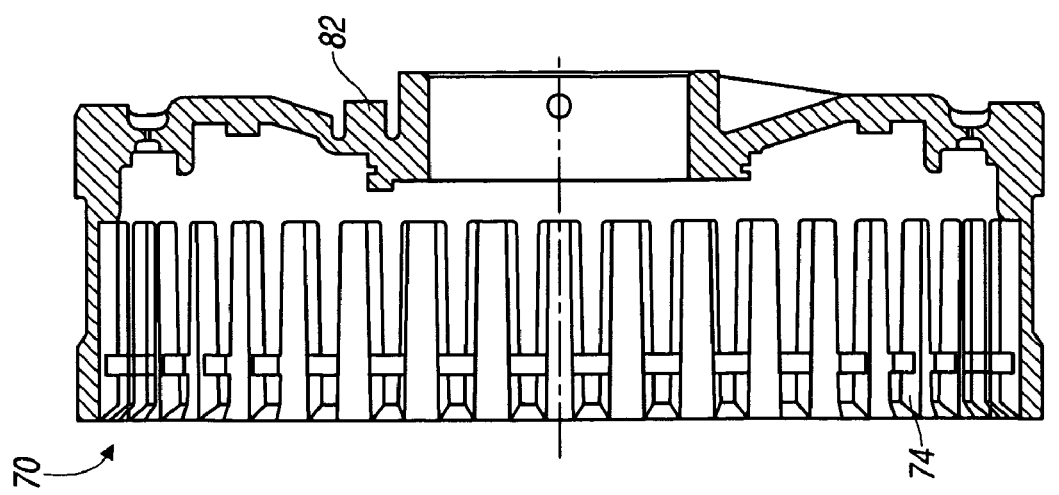
FIG. 4
FIG. 3
FIG. 2

US 8,128,529 B2

STABILIZING A PLANETARY PINION CARRIER OF AN AUTOMATIC TRANSMISSION

BACKGROUND OF THE INVENTION

1. Field of the Invention

This invention relates generally to the kinematic arrangement of an automatic transmission, and, more particularly to stabilizing a planetary pinion carrier using a preload.

2. Description of the Prior Art

In a planetary gear unit of the type used in automatic transmissions for motor vehicles planetary pinions are supported for rotation on a carrier comprising discs that are spaced axially to provide space for the pinions. The carrier is usually piloted into its correct position in the assembly on pilot surfaces formed in adjacent components.

For example, one of the carrier discs may be piloted into position on a spline and the other disc on the race of a one-way clutch (OWC). The race may not be perfectly round, and the spline may not be perfectly centered on the clutch race.

These features produce an inherent imbalance in the carrier, causing the carrier to tip on its spline and generate a large force that causes the carrier to track the out-of-round clutch race. When the carrier is piloted on imperfect interfaces, large impact loads are generated when the carrier is forced back to a centerline by the outer race profile. These impact loads on the carrier tend to upset the rocker element of the OWC, causing the rocker to pivot toward engagement when it should retract to an over-running position. When the carrier is impacted by the outer race, actuating springs, which urge the rocker toward engagement, can be destroyed and the clutch's function lost.

A need exits in the industry for a technique that avoids over-constraining the gearset and maintaining the carrier aligned with the centerline during no torque, coast events.

SUMMARY OF THE INVENTION

An assembly for stabilizing a gear unit of a transmission for an automotive vehicle includes a first component fixed against displacement along an axis, a carrier facing the first component, supported for rotation about the axis, and supporting planet pinion thereon, and springs located between the first component and the carrier, producing axial forces distributed angularly around the axis and applied to the carrier.

The stabilization springs prevent over-constrainting the gearset and keep the carrier aligned with the axis.

The preload applied to the carrier by the stabilization springs, counteracts the inherent imbalance that causes an initial tipping moment on the carrier. The preload force of the springs applies a greater moment to the carrier than the imbalance force, thereby preventing tipping of the carrier. By preventing this tipping, the carrier can not follow the race. When the race is no longer contacted by the carrier, impact loads are eliminated and the rocker of the one-way clutch remains retracted during over running conditions, preventing damage to the rocker springs.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is a side view of a disc for a brake assembly of the kinematic assembly;

FIG. 3 is front view of a subassembly containing a series of springs located in the assembly of FIG. 1; and FIG. 4 is a cross section taken at plane 4-4 of the spring subassembly of FIG. 2.

DESCRIPTION OF THE PREFERRED EMBODIMENT

Figure 1A:
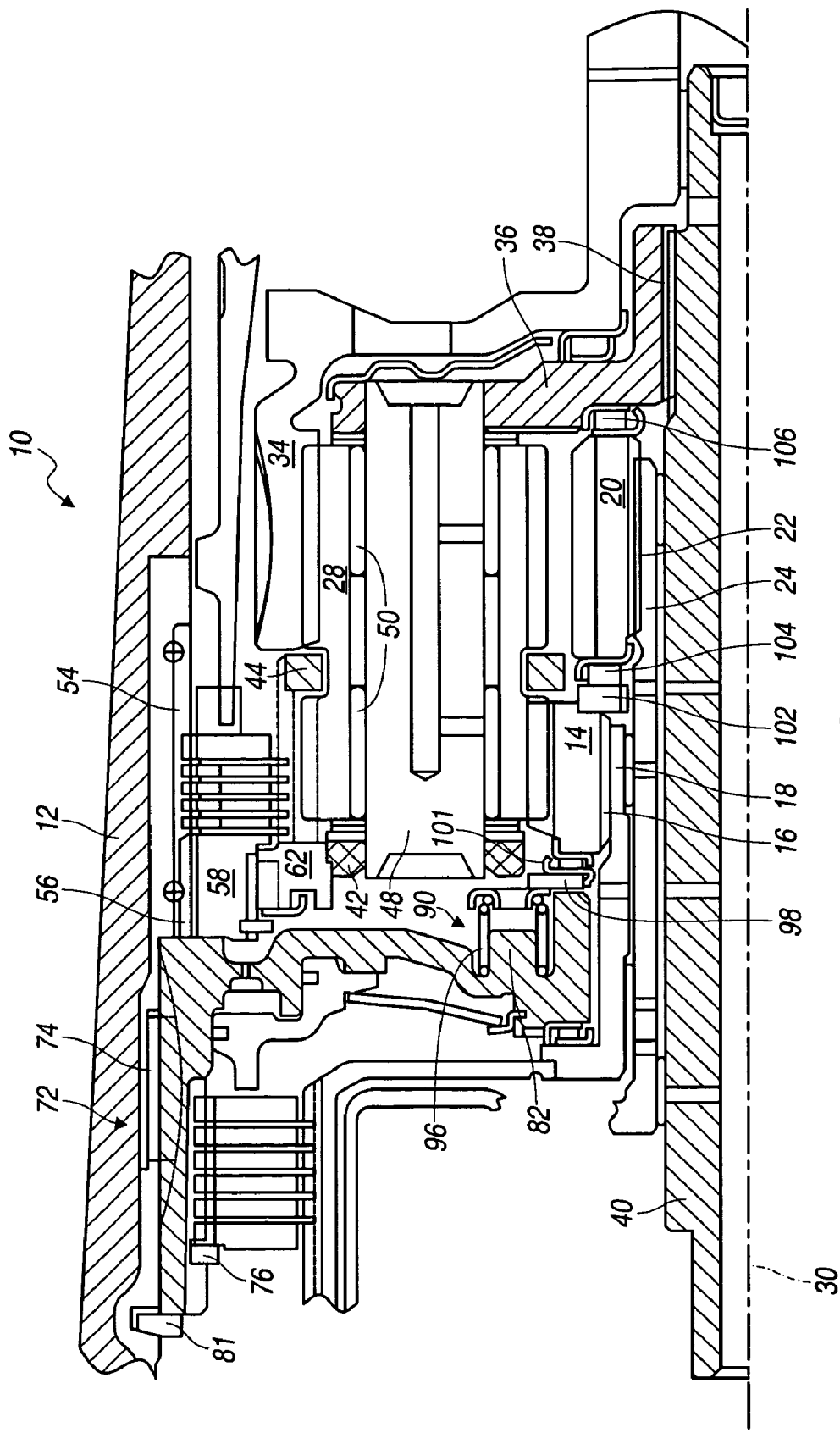
FIG. 1 is a cross section of a portion of the kinematic assembly for an automatic transmission that includes a Ravigneaux gear set.

Referring to FIG. 1, a planetary gear assembly 10 of the Ravigneaux type located in a transmission case 12 includes a first sun gear 14, connected by a spline 16 to a rotating drum 18; a second sun gear 20, connected by a spline 22 to a rotating drum 24; a planet pinion carrier assembly 26, which is supported for rotation and includes long planet pinions 28, each spaced angularly about an longitudinal axis 30, supported on the carrier 26 and meshing with sun gear 14. The carrier assembly 26 further includes a set of short planet pinions 32, each spaced angularly about axis 30, supported on carrier 26 and meshing with sun gear 20 and the long pinion 28. The gear assembly 10 further includes a ring gear 34 engaged with the long pinions 28 and arranged coaxially with the sun gears 14, 20 and pinions 28, 32.

The carrier assembly 26 includes a first disc 36, connected by a spline 38 to a shaft 40; a second disc 42, spaced axially from the first disc; and a third disc 44, located between the end discs 36, 42. The carrier discs 36, 42, 44 support pinion shafts 46, 48, on which pinions 28, 32 are supported for rotation on bearings 50, 52, respectively.

The transmission case 12 is formed at an inner surface with axially directed spline teeth 54, which are engaged with external spline teeth 56 formed on the circumferential periphery of the outer ring 58 of a rocker one-way or overrunning clutch 60. U.S. Pat. No. 7,383,930 discloses the structure and operation of a rocker one-way clutch similar to clutch 60, the entire disclosure of which is incorporated herein by reference.

An annular pilot recess 64 on the inner ring 62 of clutch 60 is engaged by carrier disc 42 and guides disc 42 into its assembled position within the case 12, and spline 38 pilots carrier disc 36 to its correct position within the case.

The disc 70 of a hydraulically-actuated friction disc brake drum 72 faces clutch 60 and carrier discs 42, 44. FIG. 2 illustrates that the disc 70 is formed with external spline teeth 74, which engage teeth formed on the inner surface of case 12. Internal spline teeth 76 engage spline teeth formed on friction discs 78 of a hydraulically-actuated brake 80. A snap ring 81 secures disc 70 against axial movement relative to the case 12. The disc 70 is also formed with cylindrical bosses 82, which are angularly spaced about axis 30.

A spring subassembly 90, shown in FIGS. 3 and 4, includes a circular plate 92 formed with angularly spaced spring retainers 94 that extend axially from the surface of the plate. A helical coiled compression spring 96, is retained in position on plate 92 at each retainer 94 due to frictional engagement of the inner surface of the spring with the radial outer surface of the retainer.

Figure 1B:
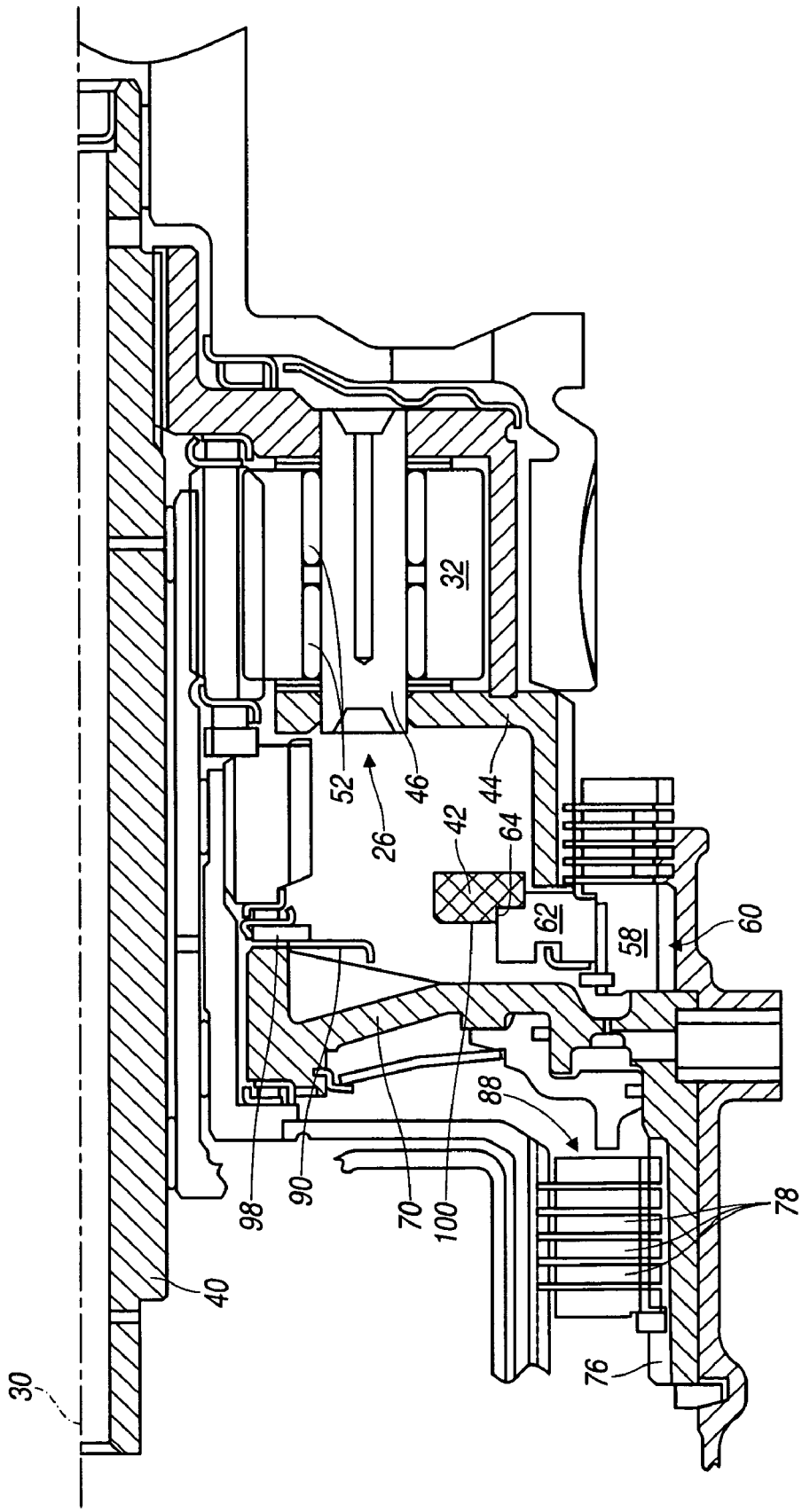

FIGS. 1A and 1B show that the spring subassembly 90 is installed such that each of its springs 96 is aligned with and frictionally engages one of the bosses 82 on disc 70. A spacer shim 98 in the form of a circular disc, fitted between plate 92 and the axial surface 100 of carrier disc 42, is installed such that springs 96 produce a preload directed axially rightward on a thrust bearing 101 located between sun gear 14 and the spacer shim 98.

The axially directed preload applied by the spring subassembly 90 to thrust bearing 101 is transmitted axially across sun gear 14; plate 102, which is secured to and rotates with sun gear 14; a second thrust bearing 104, contacting plate and sun gear 20; sun gear 20; and a third thrust bearing 106 to the inner surface of carrier disc 36. This arrangement of sun gears 14, 20 and thrust bearings 102, 104, 106 permits the spring subassembly 90 to remain secured against rotation on clutch disc 70 and to transmit the preload to the rotating carrier.

The preload counteracts an inherent imbalance that causes an initial tipping moment on the carrier 26. For the carrier 26 to tip, a gap must open between the thrust bearing 106 and the carrier disc 36. The preload force of stabilization springs 96 closes this gap and requires a force to open it. By adjusting the thickness of shim 98, the spring preload applies a greater moment to the carrier 26 than the imbalance force, preventing the carrier from tipping out of alignment with axis 30. By preventing this tipping, the carrier 26 can not follow the race 62 of overrunning clutch 60. When the race 62 is no longer contacted by the carrier 26, impact loads are eliminated. This allows the rocker of clutch 60 to remain retracted during overrunning conditions, and prevents damage to the rocker springs of the clutch.

Throughout this description use of the terms "overrunning clutch" and "one-way clutch" apply both to a clutch and a brake. An overrunning brake alternately engages to secure a component of the kinematic arrangement against rotation in one direction relative the case 12 and disengages to release the component to rotate freely in the opposite direction. A overrunning clutch alternately engages to secure two components of the kinematic arrangement against relative rotation when the speed of a first component is greater than that of a second component in one direction and disengages to release the components to rotate relative to one another when the speed of the second component is greater than that of the first component.

The helical coiled compression springs 96 may be replaced in the spring subassembly 90 by a Belleville spring that engages disc 70 and produces a preload axial force on thrust bearing 101. The preload force of the Belleville spring is transmitted axially to the rotating carrier disc 36.

In accordance with the provisions of the patent statutes, the preferred embodiment has been described. However, it should be noted that the alternate embodiments can be practiced otherwise than as specifically illustrated and described.

The invention claimed is:

1. An assembly for a transmission, comprising:
a first component fixed against displacement along an axis;
a carrier supported for rotation about the axis and supporting pinions thereon;
sun gears aligned axially and engaged with the pinions;
thrust bearings, each thrust bearing located on an opposite axial side of one of the sun gears;
springs producing axial force applied to the first component and carrier through the sun gears and thrust bearings.

2. The assembly of claim 1, wherein the thrust bearings further comprise:
a first thrust bearing located axially between the springs and a first sun gear;
a second thrust bearing located axially between the first sun gear and a second thrust bearing; and
a third thrust bearing located axially between the second sun gear and the carrier.

3. The assembly of claim 1, further comprising:
an overrunning clutch secured against axial displacement due to contact with the first component, and including an axially directed surface engaged with the carrier, and a radially directed surface contacting the carrier.

4. The assembly of claim 1, further comprising:
a spring retainer for securing the springs in position, mutually spaced about the axis such that a first end of each spring contacts the first component and a second end of each spring contacts the spring retainer.

5. The assembly of claim 1, wherein:
the first component further comprises bosses mutually spaced angularly about the axis and extending axially toward the carrier; and
further comprising a subassembly located between the carrier and first component, and including angularly spaced retainers, each retainer extending toward and aligned with one of the bosses, each spring supported on one of the bosses and one of the retainers and assembled such that each spring develops an elastic preload between the carrier and the first component.

6. The assembly of claim 1, wherein:
the first component further comprises bosses mutually spaced about the axis and extending axially toward the carrier; and
further comprising a subassembly located between the carrier and first component, and including angularly spaced retainers, each retainer extending toward and aligned with one of the bosses, each spring supported on one of the bosses and one of the retainers; and
a shim fitted in an axial space between the subassembly and the carrier such that each spring develops an elastic preload between the carrier and the first component.

7. An assembly for a transmission, comprising:
a first component fixed against displacement along an axis;
a carrier supported for rotation about the axis, and supporting pinions thereon;
sun gears aligned axial and engaged with the pinions;
thrust bearings, each thrust bearing located on an opposite axial side of one of the sun gears;
springs located between the first component and the carrier;
a shim, the springs producing force transmitted between the first component and the carrier through the shim, sun gear and thrust bearings.

8. The assembly of claim 7, further comprising a thrust bearing located between the shim and one of the sun gears.

9. The assembly of claim 7, wherein the thrust bearings further comprise:
a first thrust bearing located axially between the springs and a first sun gear;
a second thrust bearing located axially between the first sun gear and a second thrust bearing; and
a third thrust bearing located axially between the second sun gear and the carrier.

10. The assembly of claim 7, further comprising:
an overrunning clutch secured against axial displacement due to contact with the first component, and including an axially directed surface engaged with the carrier, and a radially directed surface contacting the carrier.

11. The assembly of claim 7, further comprising:
a spring retainer for securing the springs in position, mutually spaced about the axis such that a first end of each spring contacts the first component, a second end of each spring contacts the spring retainer, and the shim contacts the spring retainer.

12. The assembly of claim 7, wherein:
the first component further comprises bosses mutually spaced angularly about the axis and extending axially toward the carrier; and
further comprising a subassembly located between the carrier and first component, and including angularly spaced retainers, each retainer extending toward and aligned with one of the bosses, each spring supported on one of the bosses and one of the retainers and assembled such that each spring develops an elastic preload between the carrier and the first component.

13. The assembly of claim 7, wherein:
the first component further comprises bosses mutually spaced about the axis and extending axially toward the carrier; and
further comprising a subassembly located between the carrier and first component, and including angularly spaced retainers, each retainer extending toward and aligned with one of the bosses, each spring supported on one of the bosses and one of the retainers; and
a plate fitted in an axial space between the subassembly and the carrier such that each spring develops an elastic preload between the carrier and the first component.

14. An assembly for a transmission, comprising:
a first component fixed against displacement along an axis;
a carrier supported for rotation about the axis and supporting pinions thereon;
a sun gear engaged with the pinions;
thrust bearings, each thrust bearing located on an opposite axial side of the sun gears;
springs producing axial force applied to the first component and carrier through the sun gear and the thrust bearings.

15. The assembly of claim 14, wherein the thrust bearings further comprise:
a first thrust bearing located axially between the springs and the sun gear;
a second thrust bearing located axially between the sun gear and the carrier.

16. The assembly of claim 14, further comprising:
an overrunning clutch secured against axial displacement due to contact with the first component, and including an axially directed surface engaged with the carrier, and a radially directed surface contacting the carrier.

17. The assembly of claim 14, further comprising:
a spring retainer for securing the springs in position, mutually spaced about the axis such that a first end of each spring contacts the first component and a second end of each spring contacts the spring retainer.

18. The assembly of claim 14, wherein:
the first component further comprises bosses mutually spaced angularly about the axis and extending axially toward the carrier; and
further comprising a subassembly located between the carrier and first component, and including angularly spaced retainers, each retainer extending toward and aligned with one of the bosses, each spring supported on one of the bosses and one of the retainers and assembled such that each spring develops an elastic preload between the carrier and the first component.

19. The assembly of claim 14, wherein:
the first component further comprises bosses mutually spaced about the axis and extending axially toward the carrier; and
further comprising a subassembly located between the carrier and first component, and including angularly spaced retainers, each retainer extending toward and aligned with one of the bosses, each spring supported on one of the bosses and one of the retainers; and
a shim fitted in an axial space between the subassembly and the carrier such that each spring develops an elastic preload between the carrier and the first component.

* * * * *